United States Patent
Sonoda et al.

(10) Patent No.: US 8,081,643 B2
(45) Date of Patent: Dec. 20, 2011

(54) RELAY CONNECTION UNIT

(75) Inventors: Toshiyuki Sonoda, Yokkaichi (JP);
Yoshikazu Isoyama, Yokkaichi (JP)

(73) Assignees: Autonetworks Technologies, Ltd., Mie
(JP); Sumitomo Wiring Systems, Ltd.,
Mie (JP); **Sumitomo Electric
Industries, Ltd.**, Osaka (JP)

( * ) Notice: Subject to any disclaimer, the term of this patent is extended or adjusted under 35 U.S.C. 154(b) by 0 days.

(21) Appl. No.: 12/451,762

(22) PCT Filed: Jun. 4, 2008

(86) PCT No.: PCT/JP2008/060297
§ 371 (c)(1),
(2), (4) Date: Nov. 30, 2009

(87) PCT Pub. No.: WO2008/152962
PCT Pub. Date: Dec. 18, 2008

(65) Prior Publication Data
US 2010/0169717 A1   Jul. 1, 2010

(30) Foreign Application Priority Data
Jun. 15, 2007   (JP) ................................. 2007-159094

(51) Int. Cl.
*H04L 12/28* (2006.01)
(52) U.S. Cl. ...................................................... 370/401
(58) Field of Classification Search .................... None
See application file for complete search history.

(56) References Cited

U.S. PATENT DOCUMENTS

| | | | |
|---|---|---|---|
| 6,310,878 B1 | 10/2001 | Bodnar et al. | |
| 2002/0006139 A1* | 1/2002 | Kikkawa et al. | 370/502 |
| 2003/0009271 A1* | 1/2003 | Akiyama | 701/33 |
| 2004/0225417 A1* | 11/2004 | Sano et al. | 701/1 |
| 2006/0013237 A1 | 1/2006 | Furuta et al. | |
| 2007/0185624 A1* | 8/2007 | Duddles et al. | 701/1 |

FOREIGN PATENT DOCUMENTS

| | | |
|---|---|---|
| JP | A-10-107821 | 4/1998 |
| JP | A-2000-78203 | 3/2000 |
| JP | A-2001-168911 | 6/2001 |
| JP | A-2001-514416 | 9/2001 |

(Continued)

OTHER PUBLICATIONS

International Search Report mailed on Sep. 2, 2008 in the corresponding International Application No. PCT/JP2008/060297.

(Continued)

*Primary Examiner* — Chirag Shah
*Assistant Examiner* — Otis L Thompson, Jr.
(74) *Attorney, Agent, or Firm* — Oliff & Berridge, PLC (57) ABSTRACT

Provided is an on-vehicle relay connection unit which forms a network by arranging electronic control units between buses to which the electronic control units are respectively connected and relays a message transmitted and received between the electronic control units belonging to the different buses. The relay connection unit includes a network management processing circuit of the relay connection unit and a storage device which stores as parameters, specification conditions of the network management functions held in the network management processing circuit and a condition which may be modified among the state transition conditions between the functions. Upon start of the relay connection unit, the network management processing circuit reads out the parameters from the storage device and executes the network management functions by using the parameters.

7 Claims, 5 Drawing Sheets

FOREIGN PATENT DOCUMENTS

| | | |
|---|---|---|
| JP | A-2002-176430 | 6/2002 |
| JP | A-2006-42310 | 2/2006 |
| JP | A-2006-222649 | 8/2006 |
| JP | A-2006-352235 | 12/2006 |
| WO | WO 99/10808 | 3/1999 |

OTHER PUBLICATIONS

Apr. 26, 2011 Office Action issued in Japanese patent application No. JP2007-159094 (with translation).

* cited by examiner

| Parameter |
|---|
| Timer value |
| Error counter threshold |
| Sleep control |
| Transition destination |
| ID of relay connection unit |
| Communication speed |
| Routing table |

RELAY CONNECTION UNIT

TECHNICAL FIELD

The present invention relates to a relay connection unit and more particularly the present invention is intended to allow alteration of the specification of a network management function of the relay connection unit.

BACKGROUND ART

A communication system to be mounted on a car is conventionally adopted in which electronic control units (ECUs) controlling operations of appliances mounted on the car are connected to each other by connecting buses for multiplex communication to each other via a relay connection unit (gateway) to construct a network so that the relay connection unit relays messages sent and received among the ECUs belonging to different buses.

In recent years, owing to high functionality and performance of the car, the number of appliances to be mounted on the car has increased, and the number of messages to be relayed by the relay connection unit has also rapidly increased. When a large number of messages are sent to the relay connection unit, all the messages cannot be instantly relayed, and messages to be relayed stay inside the relay connection unit, which leads to delay in relaying the messages. Therefore the relay connection unit is desired to execute relay processing at a high speed.

Thus as disclosed in Japanese Patent Application Laid-Open No. 2006-352235 (patent document 1), there is proposed the construction in which the relay processing of the relay connection unit is executed not by software of a CPU but by hardware. As relay processing, the relay connection unit conventionally executes destination search processing of specifying a destination to which a message is to be sent and switching processing of switching a fixed length cell of the message. But in the patent document 1, the destination search processing and the switching processing are executed not by the CPU but by the search engine and the self-routing module both constructed of hardware.

Therefore the processing performance of the CPU does not adversely affect the relay speed of a message, and thereby it is possible to decrease delay in the relay of the message which is caused by low processing performance of the CPU.

In the above-described communication system to be mounted on the car, there is a case where each ECU and the relay connection unit have a network management function. The network management function means a function of initializing the ECUs connected with the buses, actuating the network, setting the network, detecting and processing the operational states of the ECUs and the network, sending signals, reading and setting parameters of the ECUs and the like in sending and receiving ring messages between the ECUs and the relay connection unit. Owing to the network management function, safety and reliability are ensured in the communication between the ECUs and the relay connection unit.

In the processing to be executed by the network management functions, specifications of parameters such as timer values, error counter thresholds, and the like are used.

But when the network management function is constructed of the hardware as disclosed in the patent document 1, the specifications of the parameters and the like to be used in each processing are incorporated in the hardware. Thus in altering the specification, it is necessary to alter the construction of the hardware. Therefore the construction disclosed in the patent document 1 has a problem that it is difficult to alter the specifications.

Because these specifications are different according to models of cars, it is necessary to construct the network management function of the hardware for each model. Thus the construction disclosed in the patent document 1 has a problem that it is impossible to commonly use the network management function constructed of the hardware.

Patent document: Japanese Patent Application Laid-Open No. 2006-352235

DISCLOSURE OF THE INVENTION

Problem to be Solved by the Invention

The present invention has been made in view of the above-described problems. It is an object of the present invention to allow alteration of a specification of a network management function of a relay connection unit and commonly use the network management function constructed of hardware, irrespective of models of cars.

Means for Solving the Problem

To solve the above-described problem, the present invention provides a relay connection unit, to be mounted on a car, in which a network is formed by interposing the relay connection unit between buses to which electronic control units are connected so that the relay connection unit relays messages sent and received between the electronic control units belonging to different buses. The relay connection unit having a network management processing circuit for executing a network management function; and a storage means for storing a specification condition of a network management function held by the network management processing circuit and a condition, of state transition conditions between functions, which may be altered by parameterizing the specification condition and the condition which may be altered. The network management processing circuit reads out the parameters from the storage means when the relay connection unit actuates and executes the network management function by using the parameters.

The network management processing circuit executes processing by using the predetermined parameters (specifications). The parameters are not provided inside the network management processing circuit, but stored in the storage means provided separately from the network management processing circuit. When the relay connection unit actuates, the network management processing circuit reads out the parameters from the storage means.

As described above, because the parameters are stored in the storage means, it is only necessary to rewrite any desired parameters stored in the storage means when they are desired to be altered and possible to easily alter them.

It is preferable that the network management processing circuit is formed of an integrated circuit; and the storage means is formed of a rewritable non-volatile memory and that the parameters to be stored in the storage means include a transition destination corresponding to a transition condition, an ID of the relay connection unit, a timer value, an error counter threshold, and a sleep control.

The network management processing circuit is constructed of hardware composed of the integrated circuit (IC) and reads the parameters (specifications) different according to models of cars from the storage means. Therefore it is possible to construct the network management processing circuit of hardware, irrespective of the specifications and commonly use the network management processing circuit constructed of the hardware, irrespective of models of cars.

By forming the network management processing circuit not of software of a CPU, but of hardware composed of the circuit of a controller, it is possible to prevent a message from delaying in its relay irrespective of the degree of the processing performance of the CPU. The CPU is capable of executing only one processing concurrently, whereas it is possible to execute not less than two processing concurrently by constructing the network management processing circuit of the hardware. Thereby it is possible to increase the processing speed of the relay connection unit.

The integrated circuit forming the network management processing circuit may be an ASIC (Application Specific Integrated Circuit) designed and produced to perform the network management function. The integrated circuit may also be an FPGA (Field Programmable Gate Array) whose internal circuit construction is alterable.

In addition to the network management processing function, the ASIC or the FPGA may have processing functions for the operation of the relay connection unit such as processing of reading parameters from the non-volatile memory, relay processing, diagnosis processing, main loop processing, and the like.

By constructing the storage means of the rewritable non-volatile memory, it is possible to rewrite parameters such as a parameter of a transition destination according to a specification alteration.

It is preferable that the network management processing circuit sends ring messages to electronic control units respectively connected to the relay connection unit via the buses to execute detection of a communication error or/and the sleep control.

By so constructing the network management processing circuit that it sends the ring message by using the parameters it has read out from the rewritable non-volatile memory, the network management processing circuit is capable of detecting a communication error and executing sleep control of transiting the mode of the relay connection unit from a wake-up mode to an electric power saving mode.

EFFECT OF THE INVENTION

As described above, in the relay connection unit of the present invention to be mounted on a car, the parameters (specifications) to be used by the network management processing circuit are not provided inside the network management processing circuit but are beforehand stored in the storage means separately from the network management processing circuit. Therefore when any desired parameters are to be altered, it is only necessary to rewrite any desired parameters of the storage means and possible to easily alter them.

EXPLANATION OF REFERENCE NUMERALS AND SYMBOLS

10: relay connection unit
11: network management processing circuit
12: EEPROM
13: EEPROM processing circuit
14: sending/receiving circuit
15: relay processing circuit
16: diagnosis processing circuit
17: main loop receiving circuit
18: parameter processing circuit
30: electronic control unit (ECU)
31: bus
32: network
41: arbitration field
43: sender-storing portion
44: destination-storing portion
45: data-storing portion
46: data field
R, RA, RB: ring message

BEST MODE FOR CARRYING OUT THE INVENTION

The embodiments of the present invention are described below with reference to the drawings.

Figure 1:
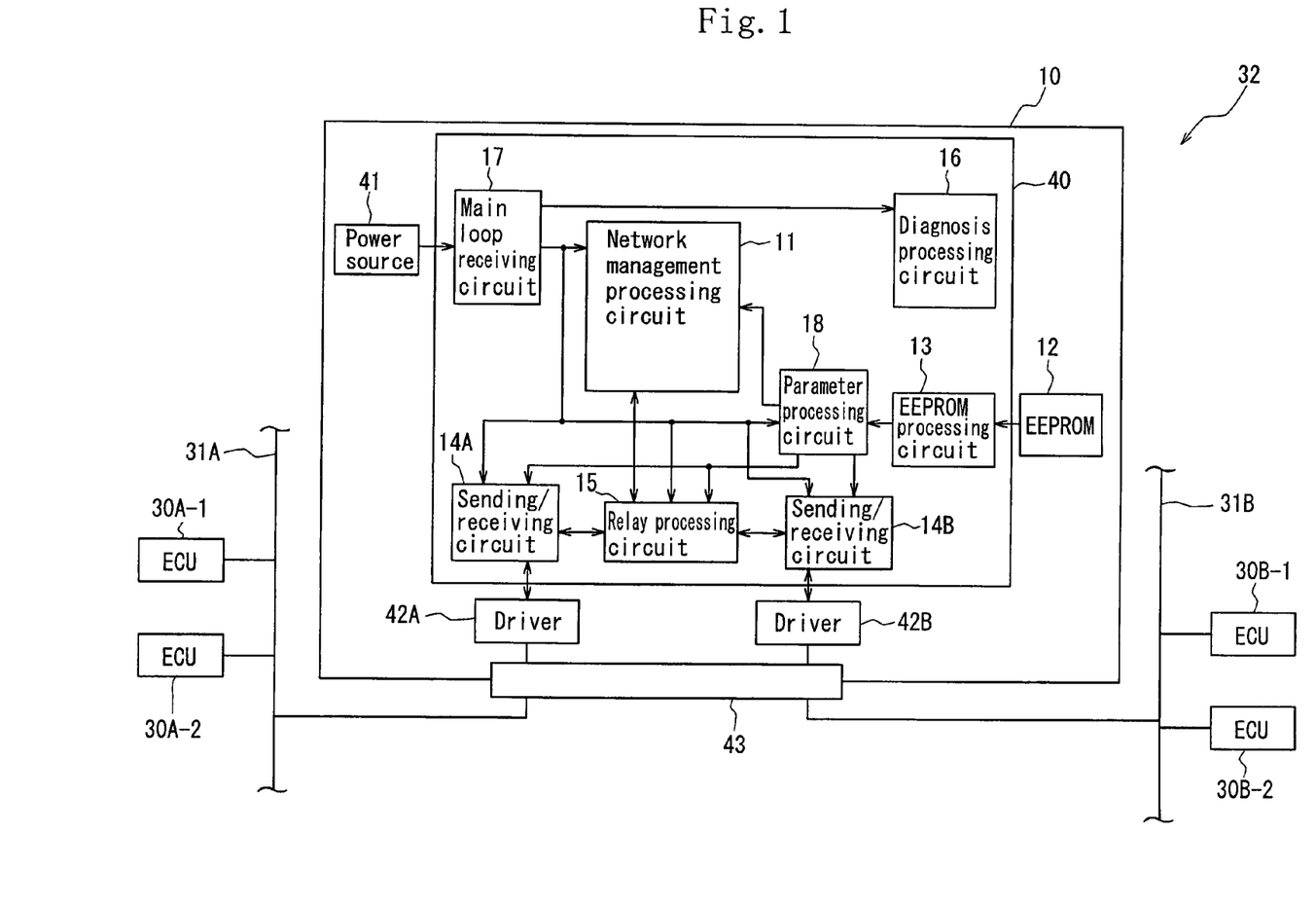
FIG. 1 is a construction diagram showing a first embodiment of a relay connection unit of the present invention.
Figure 2:
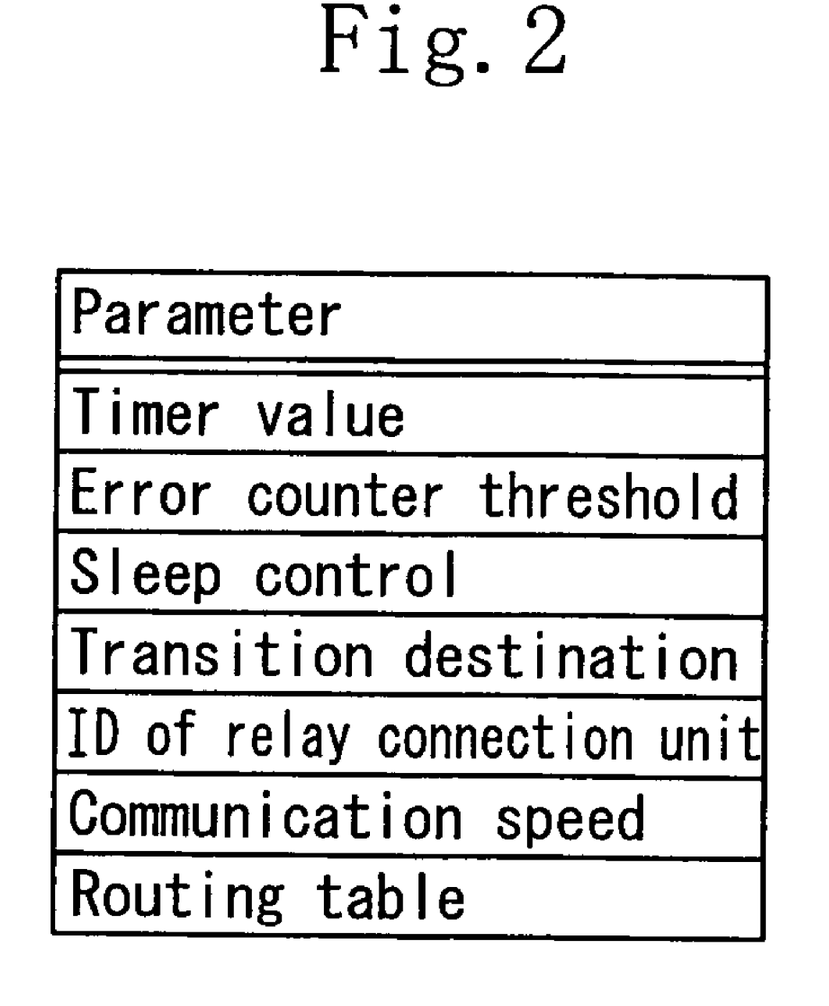
FIG. 2 shows parameters stored in an EEPROM.
Figure 3:
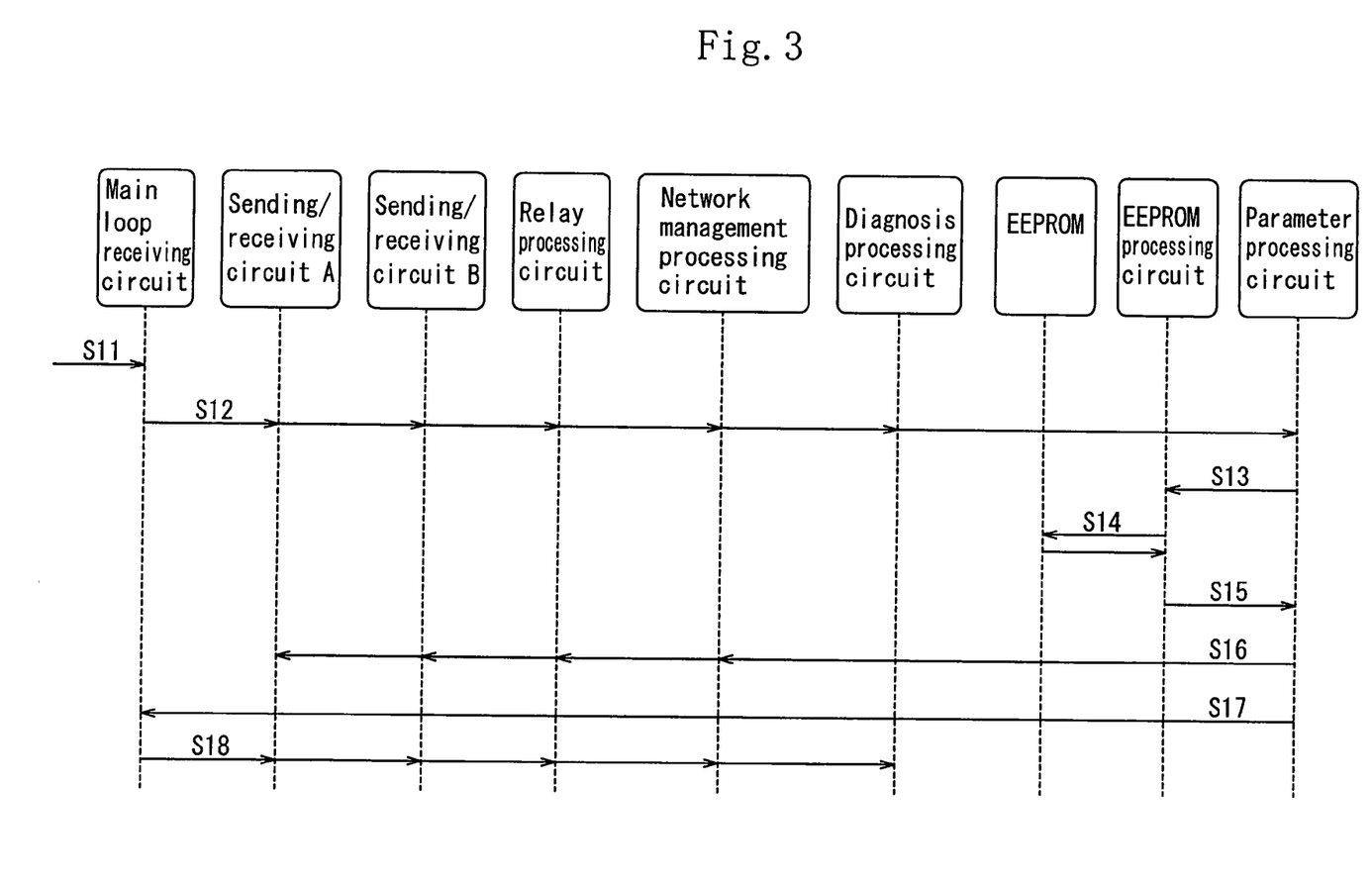
FIG. 3 is a sequence diagram showing an operation of the relay connection unit.

FIGS. 1 through 3 show the first embodiment of the present invention.

A network 32 is formed by interposing a relay connection unit 10 of the present invention to be mounted on a car between buses 31 to which the electronic control units (ECU) 30 are connected so that the relay connection unit 10 relays messages sent and received between the ECUs 30 belonging to different buses 31.

In the first embodiment, the relay connection unit 10 is interposed between two buses 31A and 31B to form the network 32, and two ECUs 30-1 and 30-2 are connected to the buses 31A and 31B respectively. As a communication protocol, CAN is used.

As shown in FIG. 1, the relay connection unit 10 has an LSI 40 for use in the relay connection unit, a power source 41, an EEPROM 12, a driver 42, and a connector 43 on the same substrate.

The LSI (Large Scale Integrated Circuit) 40 for use in the relay connection unit is constructed as hardware composed of an integrated circuit (IC) consisting of an ASIC designed to be used for the relay connection unit 10. The LSI 40 for the relay connection unit has a network management processing circuit 11 and a relay processing circuit 15, both of which will be described later and operates the relay connection unit 10.

The power source 41 is constructed of an LSI and connected with the LSI 40 for use in the relay connection unit to supply the LSI 40 for use in the relay connection unit with an electric power for driving the LSI 40.

Drivers 42A and 42B are also constructed of the LSI and provided on each bus 31 by connecting the drivers 42A and 42B with the buses 31 respectively via the connector 43. The drivers 42A and 42B are also connected with the LSI 40 for use in the relay connection unit and adjust an electric potential of data signals constructing messages to send messages received by and sent from the LSI 40 for use in the relay connection unit to the buses 31 and receive messages therefrom.

The EEPROM 12 which is a rewritable non-volatile memory constructing a storage means is connected with the LSI 40 for use in the relay connection unit and stores a specification condition of a network management function held by the network management processing circuit 11 and a condition, of state transition conditions between functions, which may be altered by parameterizing the specification condition and the condition which may be altered. The EEPROM 12 also stores conditions to be used in the relay processing circuit 15 and in a sending/receiving circuit 14 by parameterizing the conditions.

FIG. 2 shows examples of the parameters. As data relating to the network management function, the EEPROM 12 stores a transition destination corresponding to a transition condition, an ID of the relay connection unit, a timer value, an error counter threshold, and a sleep control.

For example, as the timer value, the EEPROM 12 stores parameters indicating time such as a maximum transmission interval Tmax of a ring message R sent from the network management processing circuit 11 and a standard transmission interval Ttyp of the ring message sent therefrom. For example, Ttyp=70 msce, Tmax=220 msce. The error counter threshold is a threshold of the number of detected errors of transiting the relay connection unit 10 to an error state owing to an operation of the network management processing circuit 11. An rx_limit is set to four, and a tx_limit is set to eight. The sleep control is indicated by ON and OFF. Regarding the parameter of the sleep control, it is judged whether the parameter of the sleep control is stored, based on the construction of the bus 31 connected to the relay connection unit. Only when necessary, the EEPROM 12 stores the parameter of the sleep control. As the ID of the relay connection unit 10, for example, the EEPROM 12 stores 10.

The EEPROM 12 also stores a routing table where destinations to which messages which are parameters to be used by the relay processing circuit 15 are to be relayed are described. The routing table has 163 kinds of ID of messages to be relayed.

The EEPROM 12 also stores a communication speed which is a parameter to be used by the sending/receiving circuit 14. The upper limit of the speed of CAN is set to 1 Mbps.

The rewritable non-volatile memory constructing the storage means is not limited to the EEPROM 12, but may be composed of a mask ROM or a flash memory.

The LSI 40 for use in the relay connection unit has the network management processing circuit 11, an EEPROM processing circuit 13 reading the parameters of the EEPROM 12, the sending/receiving circuit 14, the relay processing circuit 15, a diagnosis processing circuit 16, a main loop receiving circuit 17, and a parameter processing circuit 18.

The EEPROM processing circuit 13 is an interface to be connected to the EEPROM 12 and reads parameters stored in the EEPROM 12.

The parameter processing circuit 18 is connected with the EEPROM processing circuit 13 and also connected with the network management processing circuit 11, the relay processing circuit 15, and the sending/receiving circuit 14 and sends parameters the parameter processing circuit 18 has read from the EEPROM processing circuit 13 to the network management processing circuit 11, the relay processing circuit 15, and the sending/receiving circuit 14.

The network management processing circuit 11 receives parameters the EEPROM processing circuit 13 has read from the EEPROM 12 via the parameter processing circuit 18. The network management processing circuit 11 is connected with the relay processing circuit 15.

The network management processing circuit 11 secures safety and reliability in communication between the ECUs 30 and the relay connection unit 10. More specifically, by receiving the ring messages R from the ECUs 30 and sending the ring messages R thereto, the network management processing circuit 11 initializes the ECUs 30, actuates the network 32, sets the network 32, executes detection and processing of operational states of the ECUs 30 and the network 32, sends signals, reads and sets parameters of the ECUs 30 and the like. The network management processing circuit 11 uses the parameters it has read via the EEPROM processing circuit 13 to execute these processes.

Of messages the relay processing circuit 15 of the relay connection unit 10 sends and receives, the ring message R means messages which the relay processing circuit 15 sends to the network management processing circuit 11 and are used by the network management processing circuit 11.

The main loop receiving circuit 17 is connected with the power source 41 and connected with the network management processing circuit 11, the diagnosis processing circuit 16, the relay processing circuit 15, the parameter processing circuit 18, and the sending/receiving circuit 14. When the relay connection unit 10 is supplied with the power source 41, the main loop receiving circuit 17 outputs a wake-up signal to the network management processing circuit 11, the diagnosis processing circuit 16, the relay processing circuit 15, the parameter processing circuit 18, and the sending/receiving circuit 14, thus waking up the circuits.

The relay processing circuit 15 is connected with the sending/receiving circuit 14 connected with the buses 31 and executes relay processing of messages by using the routing table stored in the EEPROM 12.

When an unshown diagnosis is connected to the relay connection unit 10, the diagnosis processing circuit 16 sends data to the diagnosis and receives data therefrom.

The sending/receiving circuit 14 is provided on each of the buses 31A, 31B and sends messages to the buses 31 and receives messages therefrom by using the parameter of the communication speed stored in the EEPROM 12.

FIG. 3 is a sequence diagram showing the operation of the network management processing circuit 11 in reading the parameters from the EEPROM 12 when the relay connection unit 10 is supplied with the power source 41.

At step S11, when the power source 41 is supplied to the Main loop receiving circuit 17 of the relay connection unit 10, the main loop receiving circuit 17 is woken up.

At step S12, the main loop receiving circuit 17 sends the wake-up signals to the network management processing circuit 11, the parameter processing circuit 18, the sending/receiving circuits 14A, 14B, the relay processing circuit 15, and the diagnosis processing circuit 16. Each of the circuits which have received the wake-up signal is woken up and executes initializing processing.

At step S13, after the parameter processing circuit 18 is woken up, the parameter processing circuit 18 sends the wake-up signal to the EEPROM processing circuit 13 to wake up the EEPROM processing circuit 13.

At step S14, the EEPROM processing circuit 13 reads parameters of the EEPROM 12.

At step S15, the EEPROM processing circuit 13 outputs the parameters to the parameter processing circuit 18.

At step S16, the parameter processing circuit 18 outputs the parameters to the network management processing circuit 11. The period of time from the time when the EEPROM processing circuit 13 reads the parameters of the EEPROM 12 until the parameter processing circuit 18 outputs the parameters to the network management processing circuit 11 is sufficiently shorter than the period of time from the time the network management processing circuit 11 is woken up until the network management processing circuit 11 is initialized. Therefore the operation of the relay connection unit 10 is not delayed owing to the elapse of the period of time required to read the parameters.

Of the parameters the parameter processing circuit 18 has read out, the parameter processing circuit 18 outputs the routing table to the relay processing circuit 15. The parameter processing circuit 18 also outputs the communication speed to the sending/receiving circuits 14A, 14B.

At step S17, the parameter processing circuit 18 informs the main loop receiving circuit 17 of the completion of the read of the parameters.

At step S18, the main loop receiving circuit 17 sends start signals to the network management processing circuit 11, the sending/receiving circuits 14A, 14B, the relay processing circuit 15, and the diagnosis processing circuit 16 to place the circuits in an operable start state.

In the above-described construction, parameters to be used by the network management processing circuit 11 are stored in the EEPROM 12. Thus when any desired parameters are to be altered, it is only necessary to rewrite the parameters of the EEPROM 12 and possible to easily alter the parameters.

The network management processing circuit 11 is constructed of hardware composed of the integrated circuit (IC) and reads parameters (specifications) different according to models of cars from the EEPROM 12. Therefore it is possible to construct the network management processing circuit 11 of the hardware, irrespective of a specification and commonly use the network management processing circuit 11 constructed of the hardware, irrespective of models of cars.

Figure 4:
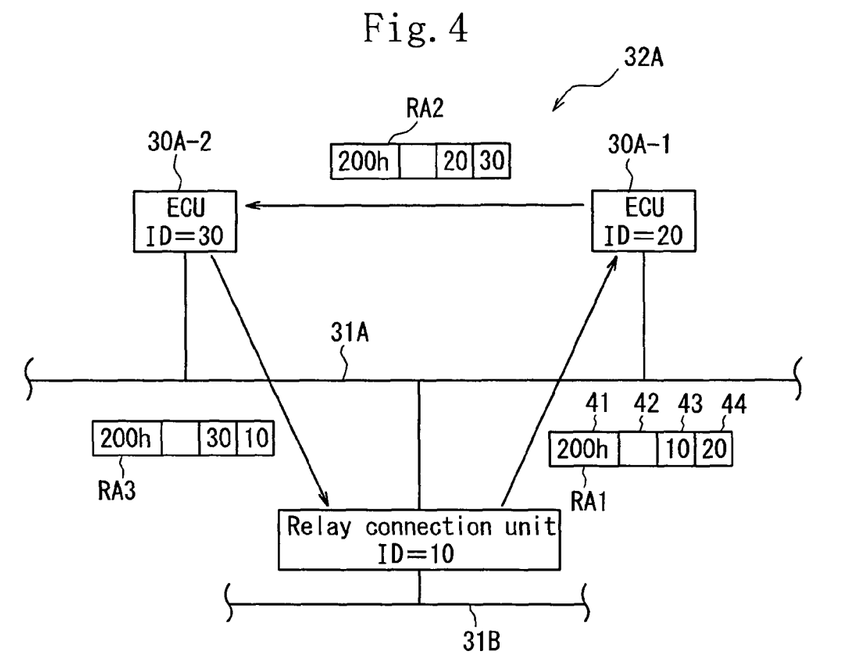
FIG. 4 is an explanatory view showing the flow of a ring message when a communication error detection function of a second embodiment is executed.
Figure 5:
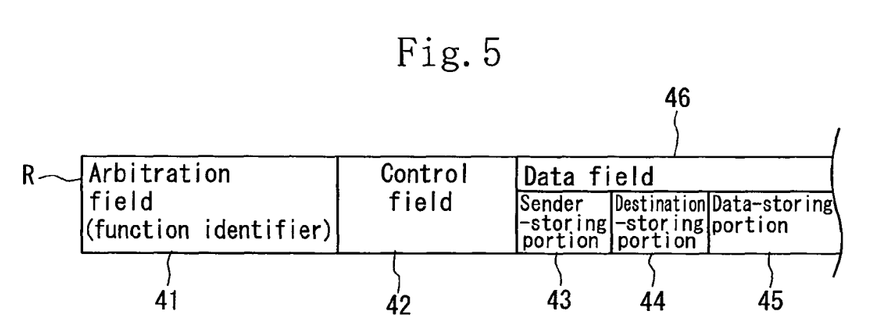
FIG. 5 is a construction diagram of the ring message.
Figure 6:
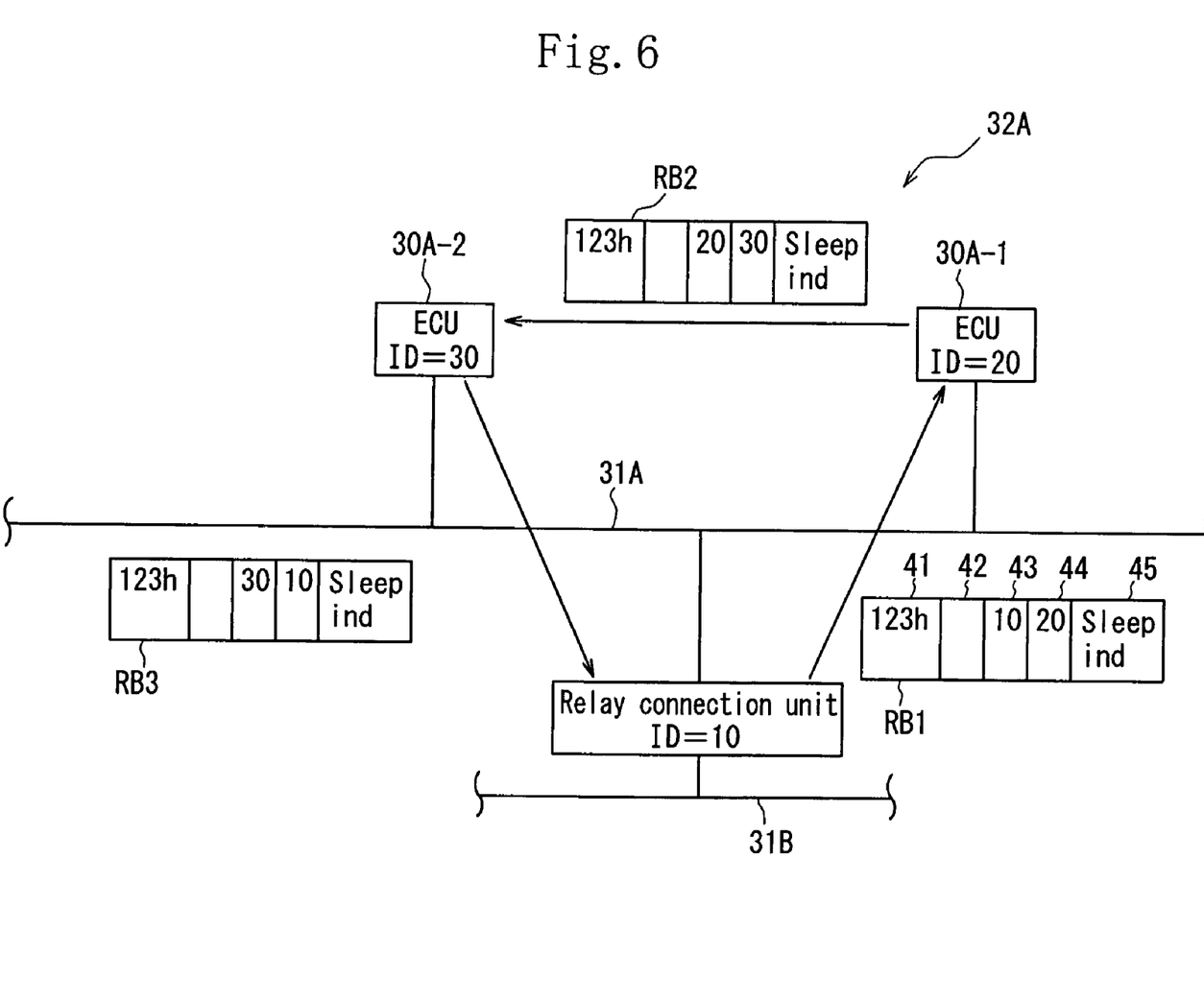
FIG. 6 is an explanatory view showing the flow of the ring message when a state transition monitoring function is executed.

FIGS. 4 through 6 show the second embodiment of the present invention.

The second embodiment shows the operation of the network management processing circuit 11 of the relay connection unit 10 of the first embodiment which has read the parameters from the EEPROM 12.

Not only the relay connection unit 10, but also the ECUs 30 connected with the buses 32 respectively have the network management processing circuit (not shown). As shown in FIG. 4, the network management processing circuit 11 of the relay connection unit 10 sends the ring messages R to the network management processing circuits 11 of the ECUs 30A-1, 30A-2 and receives ring messages R therefrom.

The network management processing circuit of the ECU 30 is constructed of a CPU and software, but may be constructed of hardware.

ECUs 30B-1, 30B-2 connected to the relay connection unit via a bus 32B send and receive the ring messages R, similarly to the ECUs 30A-1, 30A-2.

FIG. 5 shows the construction of a frame of the ring message R.

In the network management function the network management processing circuit 11 executes, of frames of the ring message R, the higher-order eight bits of the data field 46 are set as a sender-storing portion 43 storing the ID of the relay connection unit 10 or the ID of the ECU 30 from which the ring message R is sent. The following eight bits are set as a destination-storing portion 44 storing the ID of the relay connection unit 10 or the ID of the ECU 30 to which the ring message R is sent. The remaining lower-order bits of the data field 46 are set as a data-storing portion 45 storing predetermined data for each network management function.

An identifier to be described at the arbitration field 41 of the ring message R is set for each function of the network management processing circuit 11.

The data length of the data field 46 is stored at the control field 42.

The network management processing circuit 11 of the relay connection unit 10 reads the ID thereof from the EEPROM 12. Owing to the ID detection function which is one of the functions of the network management processing circuit 11, the network management processing circuit 11 of each ECU 30 and that of the relay connection unit 10 mutually have the ID of a destination to which the ring message R is sent.

In detail, at a start time of an operation of the relay connection unit 10, each of the ECUs 30 and the relay connection unit 10 store the ID thereof at both the sender-storing portion 43 of the ring message R and the destination-storing portion 44 thereof and send the ID to the bus 31. When each of the ECUs 30 and the relay connection unit 10 receive the ring message R from other ECUs 30 or the relay connection unit 10, each of the ECUs 30 and the relay connection unit 10 read an ID having a larger value than the ID thereof from the ring message R and store the ID. Thereafter, when each of the ECUs 30 and the relay connection unit 10 receive the ring message R which has been sent thereto, each of the ECUs 30 and the relay connection unit 10 send the ring message R to the ECU 30 or the relay connection unit 10 having the largest value next to that of the ID thereof.

The network management processing circuit 11 reads out the parameter of the communication speed and that of the sleep control from the EEPROM 12. The network management processing circuit 11 also reads out the maximum transmission interval Tmax of the ring message R flowing through the bus 31, the standard transmission interval Ttyp from the time when the network management processing circuit 11 receives the ring message R till the time when the network management processing circuit 11 sends the ring message R to other ECUs 30 or the relay connection unit 10, and the rx_limit and the tx_limit which are limit values of a counter (unshown) provided on the network management processing circuit 11 from the EEPROM 12.

In the second embodiment, as the network management function to be executed by the network management processing circuit 11, a communication error detection function and a state transition monitoring function that is the sleep control are described below.

Initially the communication error detection function is described below. The communication error detection function is a function of detecting an abnormal communication state in which the ECUs 30 and the relay connection unit 10 are incapable of sending the ring messages R to each other or there occurs a delay in sending and receiving the ring message R between the ECUs 30 and the relay connection unit 10.

In the relay connection unit 10 of the second embodiment, the ID of the relay connection unit 10 read out from the EEPROM 12 is set to 10. The ID of the ECU 30A-1 read out therefrom is set to 20. The ID of the ECU 30A-2 read out therefrom is set to 30. An identifier for the communication error detection function is set to 200$h$.

At this time, as shown with R1 of FIG. 4, the network management processing circuit 11 stores the ID 10 at the sender-storing portion 43 of the data field 46 of the ring message R and stores the ID 20 showing the ECU 30A-1 at the destination-storing portion 44. Nothing is stored at the data-storing portion 45. The identifier 200$h$ for detecting a communication error is stored at the arbitration field 41.

When the network management processing circuit 11 of the relay connection unit 10 sends a ring message RA1 to the bus 31A, the ECU 30A-1 and the ECU 30A-2 receive the ring message R. The network management processing circuit 11 of the ECU 30A-1 and that of the ECU 30A-2 judge whether the ID of its own is stored at the destination-storing portion 44 of the data field 46 of the ring message RA1. Because the ID of a destination to which the ring message RA1 is to be sent is 20, the ECU 30A-1 judges that the ring message RA1 has been sent thereto and thus receives the ring message RA1.

The ECU 30A-1 which has received the ring message RA1 stores the ID 20 of its own at the sender-storing portion 43 of the data field 46 and stores 30 which is the ID of the ECU 30A-2 at the destination-storing portion 44 as a ring message RA2, thus sending the ring message RA2 to the bus 31A after elapse of the term of the standard transmission interval Ttyp read out from the EEPROM 12.

The ECU 30A-2 judges that the ring message RA2 has been sent thereto, thus receiving the ring message RA2.

The ECU 30A-2 which has received the ring message RA2 stores the ID 30 of its own at the sender-storing portion 43 of the data field 46 and stores 10 which is the ID of the relay connection unit 10 at the destination-storing portion 44 as a ring message RA3, thus sending the ring message RA3 to the bus 31A after elapse of the term of the standard transmission interval Ttyp.

Upon receipt of the ring message RA3, the relay connection unit 10 judges that the ring message RA3 has been sent thereto. Receiving the ring message RA3, the network management processing circuit 11 of the relay connection unit 10 detects that the ring message R having the identifier 200*h* for detecting the communication error has circulated around the ECUs 30 and returned to the relay connection unit 10.

In this way, the ring message RA is sent and received among the relay connection unit 10, the ECU 30A-1, and the ECU 30A-2.

The communication error is detected by using the ring message RA. In the detection of the communication error, the ring message RA which has been sent to the relay connection unit and the ring message RA which has not been sent thereto are not distinguished from each other. The communication error is detected by an interval from the time when the ring message RA which has been sent to the relay connection unit or the ring messages RA which has not been sent to the relay connection unit is received until the subsequent ring message RA is received.

When the maximum transmission interval Tmax has elapsed before the network management processing circuit 11 of the relay connection unit 10 receives the subsequent ring message RA after the network management processing circuit 11 receives the ring message RA3, the relay connection unit 10 transits to a reset state, and a counter provided on the network management processing circuit 11 is incremented by +1. Thereafter the relay connection unit 10 transits to a normal state and sends the ring message R again. When the network management processing circuit 11 of the relay connection unit 10 is incapable of receiving the ring message RA after elapse of the maximum transmission interval Tmax, the relay connection unit 10 transits to the reset state, and the counter is incremented by +1. When the value of the counter becomes larger than that of the rx_limit with the repetition of this operation, it is recognized that the relay connection unit 10 is placed in an error state. For example, the value of the rx_limit is set to four.

When the network management processing circuit 11 of the relay connection unit is incapable of sending the ring message R, the relay connection unit 10 also transits to the reset state, and the counter is incremented by +1. Thereafter the relay connection unit 10 transits to the normal state. When the value of the counter becomes larger than that of the tx_limit with the repetition of this operation, it is recognized that the relay connection unit 10 is placed in the error state. For example, the value of the tx_limit is set to eight.

Not only in the relay connection unit 10, but also in the ECU 30A-1 and the ECU 30A-2, the communication error is detected similarly.

The state transition monitoring function that is the sleep control is described below.

A state transition means the state transition of the ECU 30 and that of the relay connection unit 10 from a wake-up state (normal operation state) in which a high electric power is consumed to a sleep state in which a low electric power is consumed (electric power saving mode). The state transition monitoring function means a function of the network management processing circuit 11 of switching the wake-up state of the ECU 30 connected to the bus 31 and that of the relay connection unit 10 and the sleep state thereof to each other by using the ring message R.

A case in which the state of the relay connection unit 10 and that of the ECU 30 are switched from the wake-up state to the sleep state is described below.

The network management processing circuit 11 of the relay connection unit 10 beforehand reads the parameters of the EEPROM 12 and finds that the sleep control is ON, thus recognizing that the network management processing circuit 11 operates the state transition monitoring function.

When the network management processing circuit 11 judges that the relay connection unit 10 is capable of shifting to the sleep state, the network management processing circuit 11 of the relay connection unit 10 sends a ring message RB1, as shown in FIG. 6. The network management processing circuit 11 stores the ID 10 at the sender-storing portion 43 of the data field 46 of the ring message RB1 and stores the ID 20 indicating the ECU 30A-1 at the destination-storing portion 44. The network management processing circuit 11 stores data indicating that a sleep ind signal is ON at the data-storing portion 45. The network management processing circuit 11 also stores an identifier 123*h* indicating the ring message R for the sleep control at the arbitration field 41.

After sending the ring message RB1, the relay connection unit 10 transits from the wake-up state to a sleep-possible state. The sleep-possible state means a state that although the ECU 30 or the relay connection unit 10 is placed in the wake-up state, the ECU 30 or the relay connection unit 10 is capable of going into the sleep state.

Similarly to the case in which the communication error is detected, the ECU 30A-1 which has received the ring message RB1 sends the ring message RB2 to the ECU 30A-2. At this time, in the case where the ECU 30A-1 is capable of transiting to the sleep state, data indicating that the sleep ind signal is ON is stored at the data-storing portion 45 of the ring message RB2. After sending the ring message RB2, the ECU 30A-1 transits from the wake-up state to the sleep-possible state.

The ECU 30A-2 which has received the ring message RB2 sends a ring message RB3 to the relay connection unit 10. At this time, in the case where the ECU 30A-2 is capable of transiting to the sleep state, data indicating that the sleep ind signal is ON is stored at the data-storing portion 45 of the ring message RB3. After sending the ring message RB3, the ECU 30A-2 transits from the wake-up state to the sleep-possible state.

When the network management processing circuit 11 of the relay connection unit 10 detects that all of the ECUs 30 of the network 32 are placed in the sleep-possible state owing to the receipt of the ring message RB which has returned, the network management processing circuit 11 stores data indicating that a sleep ack signal is ON at the data-storing portion 45 of a ring message RC1 and sends the ring message RC1. When a predetermined period of time has elapsed after sending the ring message RC1, the relay connection unit 10 transits to the sleep state. Similarly the ECUs 30A-1 and 30A-2 which have received ring messages RC2 and RC3 respectively transit to the sleep state when a predetermined period of time has elapsed after sending the ring message R storing the data indicating that the sleep ack signal is ON.

As described above, by using the parameters stored in the EEPROM 12, the network management processing circuit 11 is capable of executing the network management function.

Because other constructions of the second embodiment and the operation and effect thereof are similar to those of the first embodiment, the same parts of the second embodiment as those of the first embodiment are denoted by the same reference numerals and symbols as those of the first embodiment.

What is claimed is:

1. A relay connection unit, mounted on a car, in which a network is formed by interposing said relay connection unit between buses to which electronic control units are connected so that said relay connection unit relays messages sent and received between said electronic control units belonging to different buses, said relay connection unit comprising:

a network management processing circuit for executing a network management function; and a storage means for storing a specification condition of said network management function held by said network management processing circuit and a condition, of state transition conditions between functions, which may be altered by parameterizing said specification condition and said condition, wherein said network management processing circuit reads out said parameters from said storage means when said relay connection unit actuates and executes said network management function by using said parameters, said relay connection unit is configured to transition from a wake-up state to a sleep-possible state, and said relay connection unit is configured to transition from said sleep-possible state to a sleep state after all of said electronic control units of said network have been placed in said sleep-possible state.

2. The relay connection unit mounted on a car according to claim 1, wherein said network management processing circuit is formed of an integrated circuit; and said storage means is formed of a rewritable non-volatile memory; and said parameters to be stored in said storage means include a transition destination corresponding to a transition condition, an ID of said relay connection unit, a timer value, an error counter threshold, and a sleep control.

3. The relay connection unit mounted on a car according to claim 1, wherein said network management processing circuit sends ring messages to electronic control units respectively connected to said relay connection unit via said buses to execute detection of a communication error.

4. The relay connection unit mounted on a car according to claim 2, wherein said network management processing circuit sends ring messages to electronic control units respectively connected to said relay connection unit via said buses to execute detection of a communication error.

5. The relay connection unit mounted on a car according to claim 1, wherein said network management processing circuit sends ring messages to electronic control units respectively connected to said relay connection unit via said buses to execute detection of a sleep control.

6. The relay connection unit mounted on a car according to claim 2, wherein said network management processing circuit sends ring messages to electronic control units respectively connected to said relay connection unit via said buses to execute detection of said sleep control.

7. The relay connection unit mounted on a car according to claim 1, wherein said parameters to be stored in said storage means include an error counter threshold corresponding to communication errors between said relay control unit and electronic control units.

* * * * *